June 18, 1929.  J. F. MOSES  1,717,398
HITCH
Filed Oct. 31, 1927
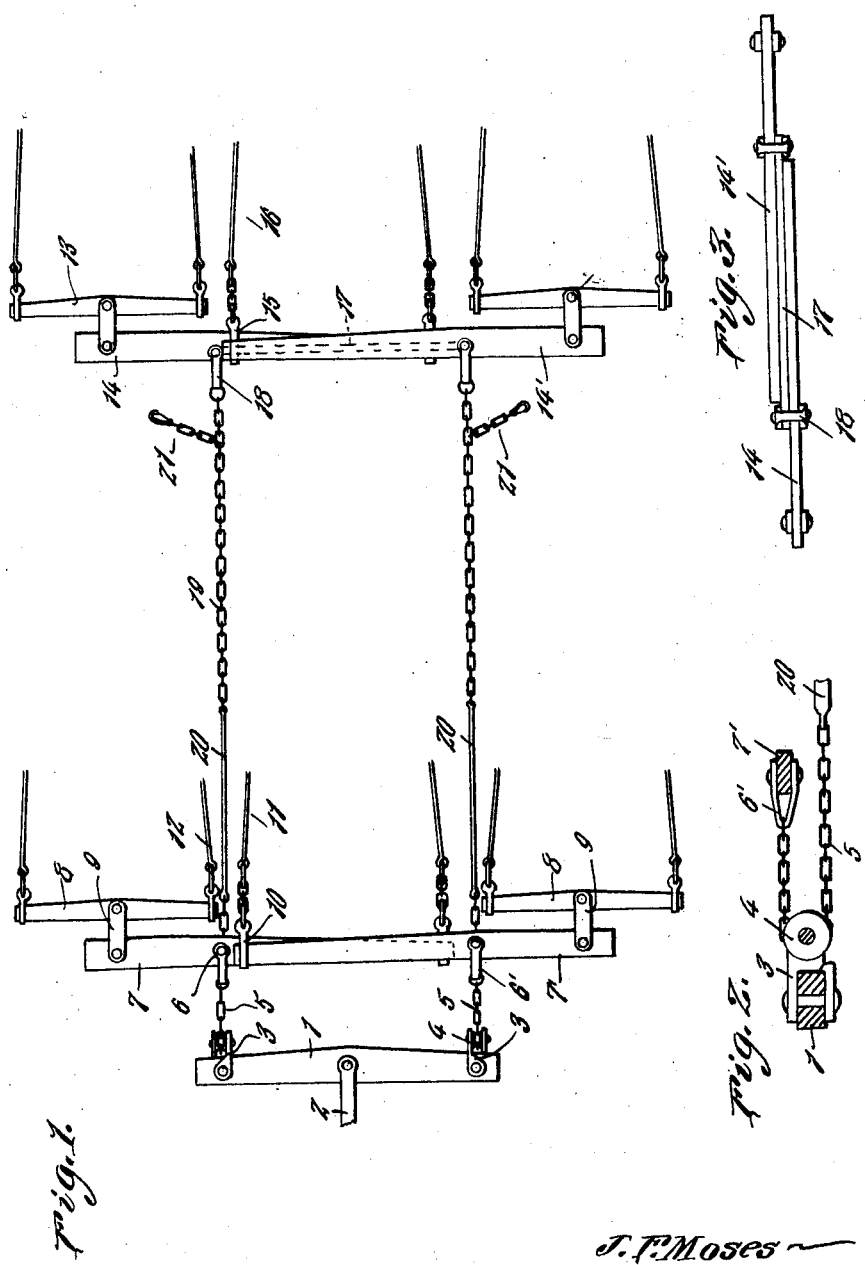
J. F. Moses
INVENTOR
BY Victor J. Evans
ATTORNEY Patented June 18, 1929.

1,717,398

UNITED STATES PATENT OFFICE.

JAMES F. MOSES, OF TANGLEFOOT, BRITISH COLUMBIA, CANADA.

HITCH.

Application filed October 31, 1927. Serial No. 230,147.

This invention relates to a hitch for implements of various kinds, the general object of the invention being to provide means for hitching six horses to the implements, three in front and three in rear.

This invention also consists in certain other features of construction and in the combination and arrangement of the several parts, to be hereinafter fully described, illustrated in the acompanying drawings and specifically pointed out in the appended claim.

In describing my invention in detail, reference will be had to the accompanying drawings wherein like characters denote like or corresponding parts throughout the several views, and in which:—

Figure 1 is a plan view of the improved hitch.

Figure 2 is a section through one end of the draft spreader and one of the evener bars, with the pulley and chain in elevation.

Figure 3 is an edge view of the front evener bars and the bar which connects said evener bars together.

In these views, 1 indicates the draft spreader which is attached to the wagon or implement by the connection 2. Brackets 3 are fastened to the ends of the member 1 and a pulley 4 is carried by each bracket. A chain 5 passes around each pulley and one end of one chain is connected to the clevis 6 of an evener bar 7, while an end of the other chain is connected to the clevis 6' of an evener bar 7'. A single tree 8 is connected by the link 9 to the outer end of each bar 7 and a clevis 10 is connected to the inner end of bars 7 and 7', the clevises 10 having attached thereto the traces 11 for the middle horse of the rear row and the traces 12 of the outside horses of said row are attached to the single trees 8. As will be seen, the bars 7 and 7' overlap each other. The single trees 13 for the outside horses of the front row are connected to the outer ends of the evener bars 14 and 14' and the clevises 15 for the traces 16 of the middle horse of the front row are connected with the inner ends of said bars 14 and 14'. These bars 14 and 14' are connected together by the strap iron rod 17 which is placed between the overlapping portions of the two bars and which is held in place by the bolts which fasten the clevises 18 to the bars 14 and 14'. Chains 19 are fastened to the clevises 18 and rods 20 connect the chains 19 with the chains 5. Short chains 21 are fastened to the chains 19 and are adapted to engage parts of the harness of the outside horses of the rear row to hold the chains 19 and rods 20 in raised position.

From the foregoing, it will be seen that the six horses are arranged in two rows, with the horses in the front row in tandem with those in the rear row and the pull is equally divided among the six horses.

What I claim is:—

A hitch of the class described comprising a member adapted to be fastened to an implement, pulleys carried by said member, a flexible member passing over each pulley, a set of evener bars connected with the rear ends of said flexible members, a set of evener bars connected with the front ends of said flexible members, clevises connecting said evener bars with said flexible members, said evener bars of each set overlapping, a strap iron rod pivoted to each of the front set of evener bars by the bolts which fasten the clevises to the bars, a single tree connected with the outer end of each evener bar and a clevis connected with the inner end of each bar, each set of clevises being designed to receive the traces of a middle horse.

In testimony whereof I affix my signature.

JAMES F. MOSES.